(12) United States Patent
Gonda et al.

(10) Patent No.: US 6,254,465 B1
(45) Date of Patent: Jul. 3, 2001

(54) METHOD OF MACHINING WAFER FOR MAKING FILMED HEAD SLIDERS AND DEVICE FOR MACHINING THE SAME

(75) Inventors: Kazuhisa Gonda, Chungnam (KR); Tomokazu Sugiyama; Kentaro Suzuki, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/205,929

(22) Filed: Dec. 4, 1998

(30) Foreign Application Priority Data

Jun. 29, 1998 (JP) .................................................. 10-181930

(51) Int. Cl.⁷ .................................................. B24B 29/00
(52) U.S. Cl. ................................ 451/287; 451/6; 451/41; 451/288
(58) Field of Search ................................ 451/6, 41, 444, 451/443, 287, 288

(56) References Cited

U.S. PATENT DOCUMENTS

| | | | |
|---|---|---|---|
| 4,656,787 | * | 4/1987 | Ueda et al. ............................ 451/143 |
| 4,956,944 | * | 9/1990 | Ando et al. .............................. 451/5 |
| 4,980,993 | * | 1/1991 | Umezaki ............................. 51/165.71 |
| 5,067,085 | * | 11/1991 | Wenzel et al. ..................... 364/474.06 |
| 5,077,941 | * | 1/1992 | Whitney ..................................... 451/5 |
| 5,605,499 | * | 2/1997 | Sugiyama et al. ..................... 451/443 |
| 5,613,894 | * | 3/1997 | Delle Vedove ........................... 451/1 |
| 5,649,849 | * | 7/1997 | Pileri et al. ............................... 451/1 |
| 5,736,427 | * | 4/1998 | Henderson ............................... 438/14 |
| 5,751,481 | * | 5/1998 | Daizell et al. ......................... 359/485 |
| 5,941,761 | * | 8/1999 | Nagahara et al. ..................... 451/56 |

FOREIGN PATENT DOCUMENTS

| | | |
|---|---|---|
| 62-61019 | 4/1987 | (JP) . |
| 7-107309 | 4/1995 | (JP) . |

* cited by examiner

*Primary Examiner*—Allen Ostrager
*Assistant Examiner*—William Hong
(74) *Attorney, Agent, or Firm*—Greer, Burns & Crain, Ltd.

(57) ABSTRACT

A filmed head slider, which is capable of writing data with high density, can be made by uniformly machining film layers formed on a wafer for making the filmed head sliders. The method of machining the wafer comprises the steps of: measuring curvature of the filmed surface of the wafer; selecting a machining plate having a machining face, whose curvature is in accord with that of the filmed surface of the wafer, on the basis of the result of the measuring step; and machining the filmed surface of the wafer with the selected ma chining plate.

9 Claims, 3 Drawing Sheets

METHOD OF MACHINING WAFER FOR MAKING FILMED HEAD SLIDERS AND DEVICE FOR MACHINING THE SAME

BACKGROUND OF THE INVENTION

The present invention relates to a method of machining a wafer for making filmed head sliders and a device for machining said wafer, and more precisely relates to a method of lapping or polishing said wafer during a process of forming film layers thereon and a device for lapping or polishing said wafer.

The filmed head slider is made by the steps of: forming a plurality of film layers on a wafer, which is a substrate; and forming various fine patterns in the film layers by etching, etc. In the forming step, a plurality of the film layers are piled on the wafer, so there are formed undulated parts, uneven parts, step-formed parts, etc. on the filmed surface of the wafer. If the film layers are piled with the undulated parts, etc., shapes and measurements of products will be badly influenced.

These days, recording media are made smaller in size but they have large capacity of memory, so the head sliders are required to be highly precisely machined. As described above, if there are undulated parts, etc., formed on the surface of the wafer, measurements of products are badly influenced and yield thereof is also reduced. Thus, the surface of the wafer is lapped or polished so as to remove the undulated parts, etc. and uniformly finish the whole surface thereof.

In the ordinary lapping or polishing step, the wafer is mounted on a machining plate (a lapping plate or a polishing plate), a prescribed pressure is applied to the wafer, and the surface is lapped or polished by the machining plate. However, lapping or polishing is advanced much in the vicinity of an outer edge of the wafer, so lapping or polishing cannot be uniformly executed on the wafer.

A conventional method of uniformly lapping the wafer with a partial load will be explained with reference to FIG. 7. A wafer 12, which is mounted on a machining plate 10, is pressed by a work presser 14. The work presser 14 is properly shifted from a center of the wafer 12, so the partial load is applied to the wafer 12. By using the partial load method, the film layers 16 on the surface of the wafer 12 can be uniformly lapped by the machining plate 10. However, this method cannot always selectively lap uneven parts, and bad wafers are sometimes produced because of excessive lapping by the partial load.

A substrate of the wafer is sometimes bent, and the wafer is sometimes slightly bent while forming the film layers and etching the film layers. In this case, the bend of the wafer must be corrected by force while lapping. However, excessive force sometimes peels off the film layers and deforms end faces of element sections.

SUMMARY OF THE INVENTION

An object of the present invention is to provide a method of machining a wafer for making filmed head sliders and a device for machining said wafer, which are capable of precisely lapping or polishing the wafer while the process of forming the film layers, increasing the yield of making the filmed head sliders and increasing the reliability thereof.

To achieve the object, the present invention has following constitution.

The method of machining a wafer for making filmed head sliders, on which a plurality of film layers are formed, comprises the steps of: measuring curvature of a filmed surface of the wafer; selecting a machining plate having a machining face, whose curvature is in accord with that of the filmed surface of the wafer, on the basis of the result of the measuring step; and machining the filmed surface of the wafer with the selected machining plate.

Another method of machining a wafer for making filmed head sliders, on which a plurality of film layers are formed, comprises the steps of: measuring curvature of a filmed surface of the wafer; and machining the filmed surface of the wafer with a machining plate, whose curvature of a machining face is made accord with that of the filmed surface of the wafer, by external force, on the basis of the result of the measuring step.

The machining device for machining a wafer for making filmed head sliders, on which a plurality of film layers are formed, comprises: a measuring unit for measuring curvature of a filmed surface of the wafer; and a machining unit for machining the filmed surface of the wafer with a machining plate having a machining face whose curvature is in accord with that of the filmed surface of the wafer, wherein the machining plate is selected on the basis of the result measured by the measuring unit.

In the method and the device of the present invention, the filmed surface of the wafer can be precisely and uniformly machined (lapped or polished), so the wafer can be securely machined even if fine patterns are formed in an element sections, and the filmed head slider, which is capable of recording data with high density, can be easily produced. Since no load is concentrated in a part of the wafer while machining, the characteristic of the film layers are not badly influenced, and quality of the wafer for the filmed head slider can be improved.

BRIEF DESCRIPTION OF THE DRAWINGS

Embodiments of the present invention will now be described by way of examples and with reference to the accompanying drawings, in which.

DETAILED DESCRIPTION OF THE PREFERRED EMBODIMENTS

Preferred embodiments of the present invention will now be described in detail with reference to the accompanying drawings.

Figure 1:
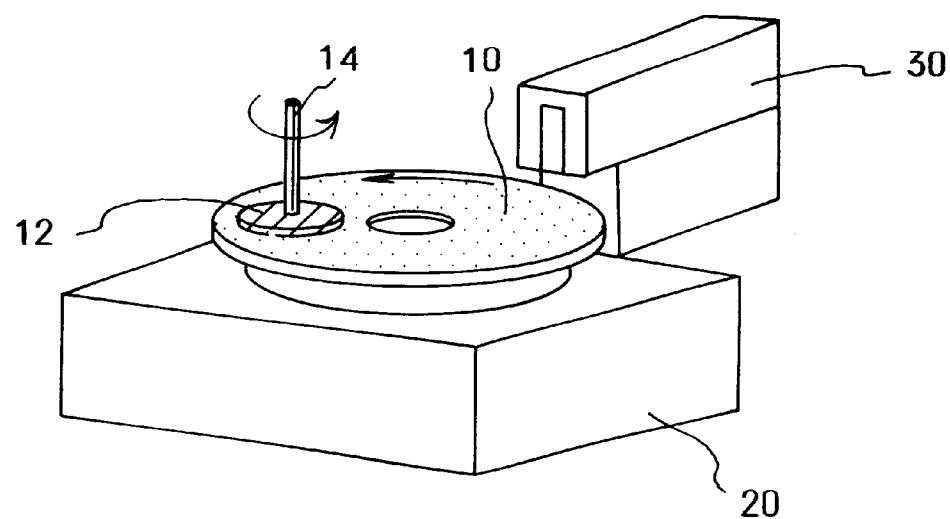
FIG. 1 is an explanation view showing a whole structure of a machining device of an embodiment of the present invention.

Fig. 1 is the explanation view showing the whole structure of the device for machining the filmed head slider. A device proper 20 of the machining device includes a rotary table 22 and a driving mechanism for rotating the rotary table 22. A machining plate 10 is set on the rotary table 22 and rotated together with the rotary table 22.

A wafer 12 is held by a work holder 14, pressed onto the machining plate 10 and rotated. An upper part of the work holder 14 is connected to a press-rotary mechanism.

A measuring unit 30 measures curvature of a filmed surface of the wafer 12 to be machined. In the present embodiment, the machining device laps or polishes the surface of the wafer 12 with the machining plate 10 having a machining face (a lapping face or a polishing face), whose curvature is in accord with that of the filmed surface of said wafer 12.

In the process of forming the film layers or etching the film layers, dispersion of thickness of the film layers and dispersion of amount of lapping or polishing occur. Through dispersion, the filmed surface of the wafer 12 is slightly formed into a curved face. The measuring unit 30 measure the curvature of the curved filmed surface of the wafer 12, and the proper machining plate 10 having the machining face, whose curvature is in accord with that of the filmed surface of the wafer 12, is selected on the basis of the result of the measurement.

For example, the measuring unit 30 includes an image processing system, which is capable of automatically measuring surface condition of the wafer 12. All wafers 12 may be measured; in the case that the surface conditions of the wafers in one lot are almost same, the measurement may be executed when the lot of the wafers is changed. The process of forming layers, etc. is changed when the lot of the wafers or a type of products is changed, so the measurement may be executed when the size of the wafers is changed.

The most proper machining plate 10 having the lapping or polishing face, which has proper curvature, is selected on the basis of the measurement by the measuring unit 30. Actually, a plurality of the machining plates 10, whose machining faces are formed into curved (spherical) faces having different curvature, are previously prepared, and the most proper one, whose curvature is in accord with that of the surface of the wafer, is selected from them. In the case that the curvature of the machining plate 10 is not perfectly equal to that of the wafer, the surface of the wafer can be satisfactorily machined if the curvature of the machining plate 10 is nearly equal to that of the wafer.

Figure 2:
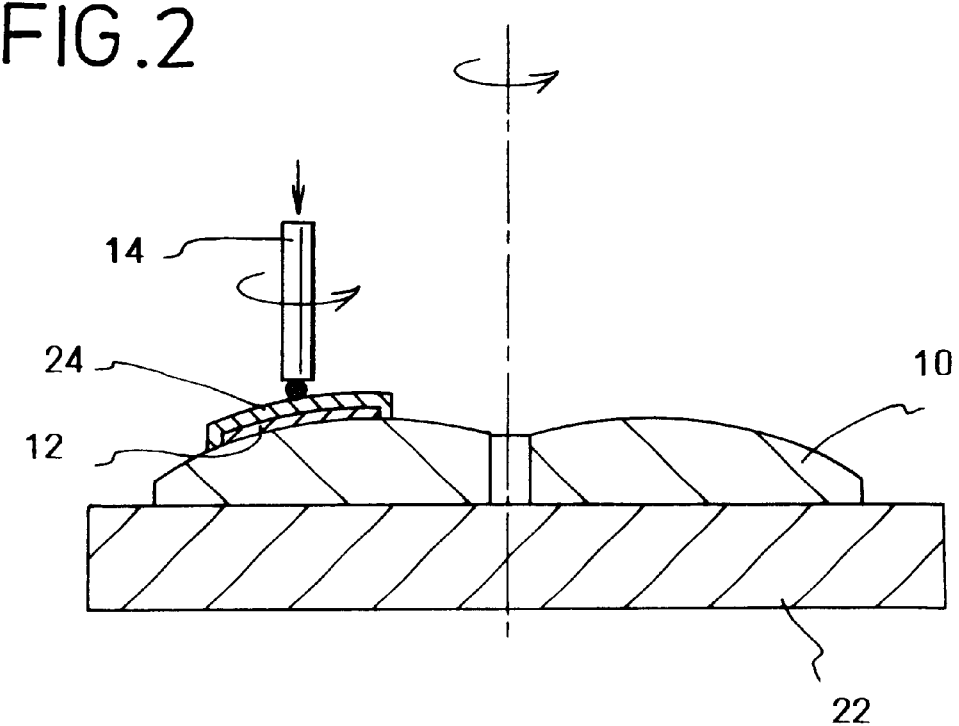
FIG. 2 is an explanation view showing a state of machining the wafer with a machining plate.

FIG. 2 is an enlarged view showing the state in which the wafer 12 is machined by the machining plate 10 having the curved machining face. The machining face of the machining plate 10 is upwardly projeted; the surface of the wafer 12 to be machined is a concave face. The wafer 12 is pressed onto the projected machining face of the machining plate 10, which is rotated, so that the concave face of the wafer 12 is fitted to the projected machining face of the machining plate 10, and the whole concave face of the wafer 12 is lapped.

Since the curvature of the machining face of the machining plate 10 is in accord with that of the surface of the wafer 12, the dispersion of amount of lapping or polishing can be improved. An edge part of the wafer 12 is not lapped much more than other parts thereof. The whole surface of the wafer 12 can be uniformly lapped.

Note that, in the case of polishing the wafer, polishing cloth is fixed on the machining face, which has the proper curvature, of the machining plate 10, so the whole surface of the wafer 12 can be polished.

Figure 3:
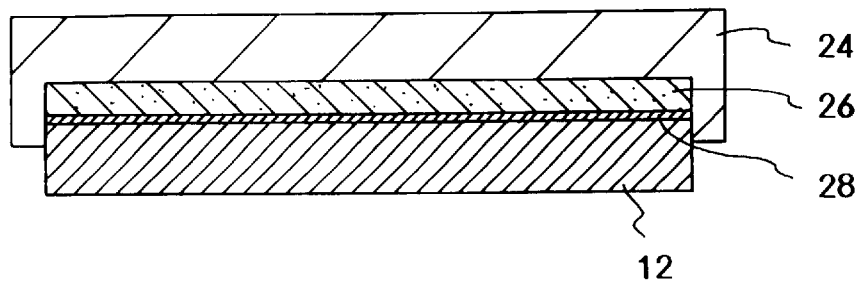
FIG. 3 is a sectional view of a wafer chuck.
Figure 4:
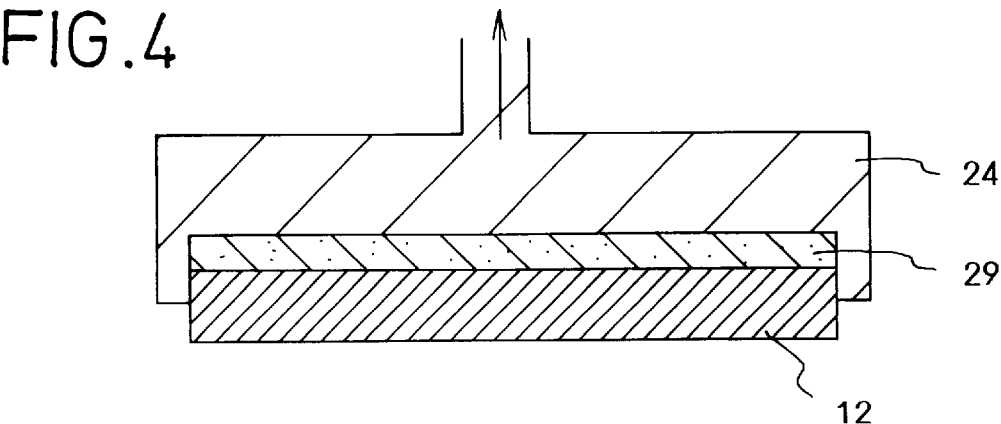
FIG. 4 is a sectional view of the wafer chuck.

A wafer chuck 24 holds the wafer 12. Enlarged views of the wafer chuck 24 are shown in FIGS. 3 and 4. In FIG. 3, the wafer 12 is held by water. Cloth 26 is adhered on an inner face of the wafer chuck 24, the cloth 26 has sucked up water, and the wafer 12 is pressed onto the cloth 26, so that a space therebetween is in a vacuum condition and the wafer 12 is held. A symbol 28 stands for a water layer.

In FIG. 4, the wafer 12 is fixed by air suction. A symbol 29 stands for a ceramic section, and the air is sucked through air paths in the ceramic section 29 so as to fix the wafer 12 thereon.

As described above, the wafer 12 is held by the wafer chuck 24 and lapped by the curved lapping face of the machining plate 10, so the surface of the wafer can be precisely machined, a problem of excessively machining the surface of the wafer can be solved, and proper lapping or polishing can be executed in the wafer having fine patterns.

By uniformly applying load to the wafer, the load is not concentrated to a part of the wafer, so the problems of deforming a part of the film layers and losing desired characteristic can be solved.

The characteristic point of the method of the present invention is that the film layers of the wafer are lapped or polished by the machining plate having the machining face, whose curvature is in accord with that of the filmed surface of the wafer. Thus, the machining plate is selected on the basis of the curvature of the wafer. Further, the machining plate may be deformed, by external force, so as to make the curvature of the machining face equal to that of the surface of the wafer. Actually, in some cases, the slight curved face is required as the machining face, so as material of the machining plate is properly selected and the machining plate is fixed to the rotary table by partial air suction so as to form the proper curved face in the machining face. The machining plate may be deformed, by external force, so as to make the machining face have the proper curvature.

Concrete examples will be explained.

EXAMPLE 1

Figure 5:
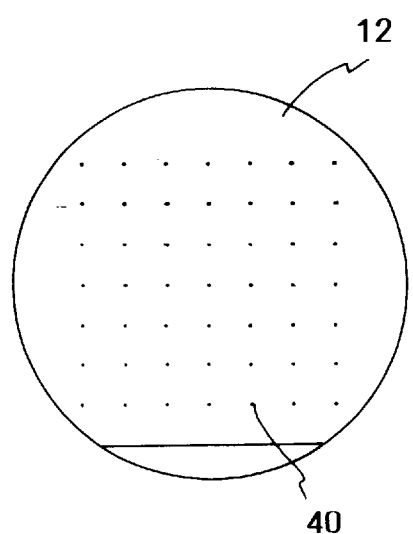
FIG. 5 is a plan view of the wafer on which patterns are formed.
Figure 6A:
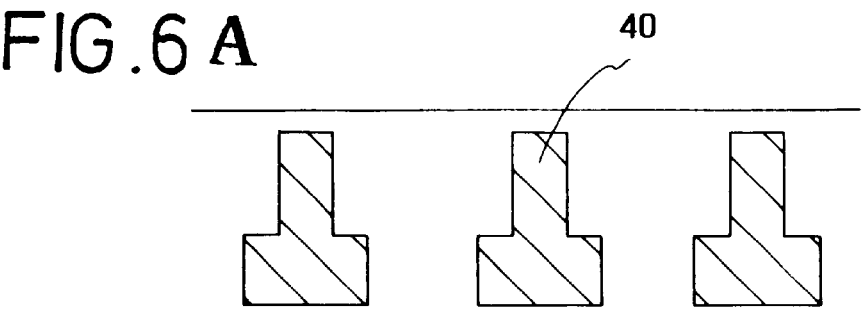
FIG. 6A is a plan view of the patterns formed on the wafer.
Figure 6B:
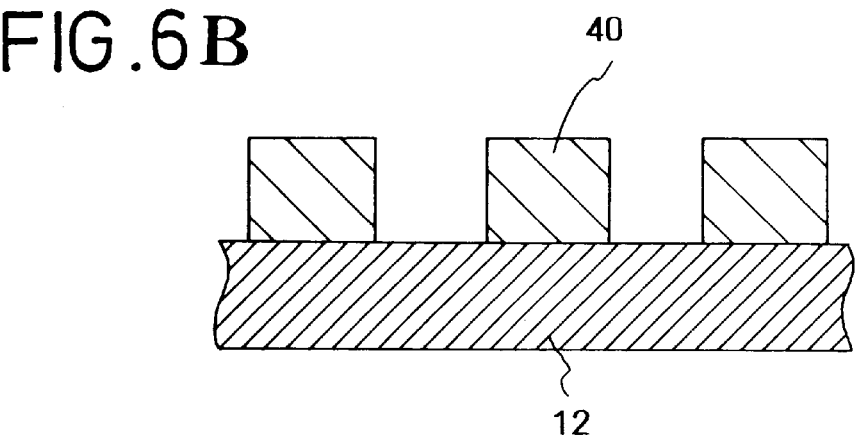
FIG. 6B is a sectional view of the patterns formed on the wafer.
Figure 7:
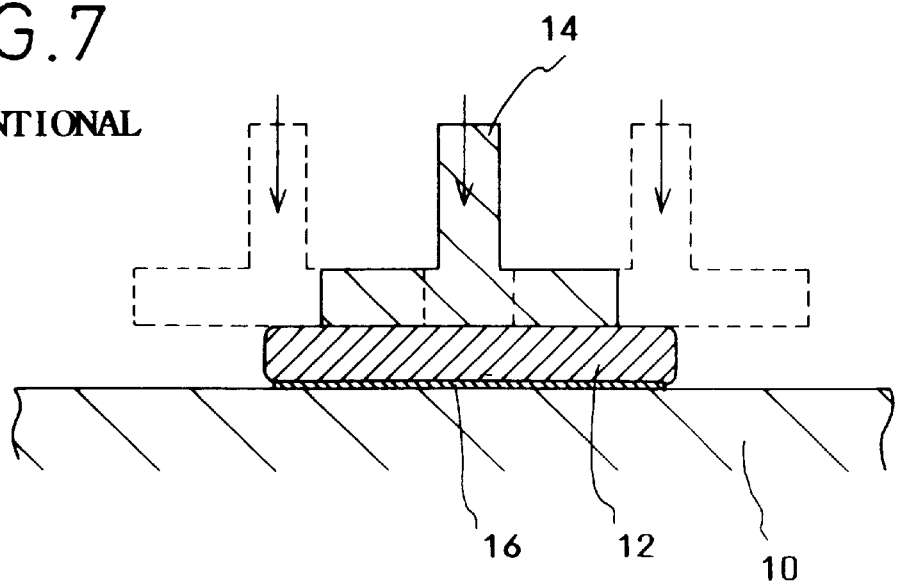
FIG. 7 is an explanation view showing the conventional method in which the partial load is applied.

In FIGS. 5, 6A and 6B, a symbol 40 stands for patterns formed on a sample wafer to be polished. The patterns 40 are matrically formed on the surface of the wafer with regular separations as shown in FIG. 5. FIG. 6A is a plan view of the patterns 40; FIG. 6B is a sectional view thereof. In each pattern 40, width is about 300 $\mu$m; a planar shape is a T-shape; height from the surface of the wafer is about 3.5 $\mu$m. Outer diameter of the wafer is 4 inches; thickness thereof is 4 mm.

The wafer was polished under following conditions: specific cloth was adhered on a machining face of a machining plate; slurry, which includes free silica abrasive, was sprinkled as polishing liquid; and the machining plate was rotated at rotational speed of 80 r.p.m. The wafer as stuck to the chuck 24 by water as shown in FIG. 3.

The center part of the machining face of the machining plate was spherically projected with the curvature of 0.025%; in comparison with the case of using a machining plate having a flat machining face, the dispersion $\sigma$ of the thickness of the patterns 40 could be reduced by 0.03–0.07 $\mu$m. Namely, in the case of polishing by the flat machining face, the dispersion was about 0.2 $\mu$m; in the case of polishing by the curved machining face of the present example, the dispersion was about 0.13 $\mu$nm.

Further, the initial amount of undulation (MAX-MIN) of the wafer was about 80 nm, but the amount of undulation (MAX-MIN) could be improved to about 2 nm in the present example.

EXAMPLE 2

Patterns, whose thickness was about 3.5 $\mu$m and whose width was 300 $\mu$m, were formed on a wafer as shown in FIGS. 5, 6A and 6B, an alumina layer was further formed, by spattering, so as to protect the patterns, and the wafer was lapped and polished. Outer diameter of the wafer was 5 inches; thickness thereof was 2 mm.

The wafer was lapped under following conditions: a machining plate was a copper plate; slurry, which included free diamond abrasive, was sprinkled as polishing liquid; and the machining plate was rotated at rotational speed of 80 r.p.m. The wafer was polished under the conditions of Example 1. The wafer was held by the ceramic chuck shown in FIG. 4.

The center part of the lapping face of the copper machining plate was spherically projected with the curvature of 0.025% as in Example 1; the center part of the polishing face of the machining plate was spherically projected with the curvature of 0.025% as well. So the waver could be uniformly machined. And, the initial amount of the undulation (MAX-MIN) of the wafer was about 80 nm, but the amount of undulation (MAX-MIN) could be improved to about 0.5 nm in the present example.

EXAMPLE 3

To improve the roughness of film layers on a wafer, a plating layer was holly formed on a surface of the wafer, then the plating layer was polished to improve said roughness. The polishing was executed under the conditions of Example 1.

By using the center part of a polishing face of a machining plate which was spherically projected with the curvature of 0.025%, the wafer could be uniformly polished and the roughness of the wafer could be improved.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and ranging of equivalency of the claims are therefore intended to be embraced therein.

What is claimed is:

1. A method of machining a wafer for making filmed head sliders, on which a plurality of film layers are formed, comprising the steps of:
    measuring a radius of curvature of a filmed surface of the wafer;
    selecting a machining plate having a machining face, whose radius of curvature is in accord with that of said filmed surface of the wafer, on the basis of the result of said measuring step; and
    machining said filmed surface of the wafer with said selected machining plate.

2. The method according to claim 1, wherein said step of machining includes lapping said filmed surface of the wafer.

3. The method according to claim 1, wherein said step of machining includes polishing said filmed surface of the wafer.

4. A method of machining a wafer for making filmed head sliders, on which a plurality of film layers are formed, comprising the steps of:
    measuring a radius of curvature of a filmed surface of the wafer; and
    machining said filmed surface of the wafer with a machining plate having a machining face whose curvature is in accord with a measured curvature of the filmed surface of the wafer.

5. The method according to claim 1, wherein said step of machining includes lapping said filmed surface of the wafer.

6. The method according to claim 1, wherein said step of machining includes polishing said filmed surface of the wafer.

7. A machining device for machining a wafer for making filmed head sliders, on which a plurality of film layers are formed,
    comprising:
    a measuring unit for measuring a radius of curvature of a filmed surface of the wafer; and
    a machining unit for machining said filmed surface of the wafer with a machining plate having a machining face whose radius of curvature is in accord with that of said filmed surface of the wafer, wherein said machining plate is selected on the basis of the result measured by said measuring unit.

8. The machining device according to claim 7, wherein said machining unit is a lapping unit.

9. The machining device according to claim 7, wherein said machining unit is a polishing unit.

* * * * *

UNITED STATES PATENT AND TRADEMARK OFFICE
CERTIFICATE OF CORRECTION

PATENT NO.    : 6,254,465 B1
DATED         : July 3, 2001
INVENTOR(S)   : Gonda et al.

It is certified that error appears in the above-identified patent and that said Letters Patent is hereby corrected as shown below:

<u>Column 6,</u>
Line 23, delete "claim 1" and insert -- claim 4 --.
Line 25, delete "claim 1" and insert -- claim 4 --.

Signed and Sealed this

Fourth Day of February, 2003

JAMES E. ROGAN
*Director of the United States Patent and Trademark Office*